Aug. 28, 1962  A. I. ZAGAR  3,051,013
FORWARD AND REVERSE FRICTION DRIVE TAPPING ATTACHMENT
Filed Aug. 22, 1958
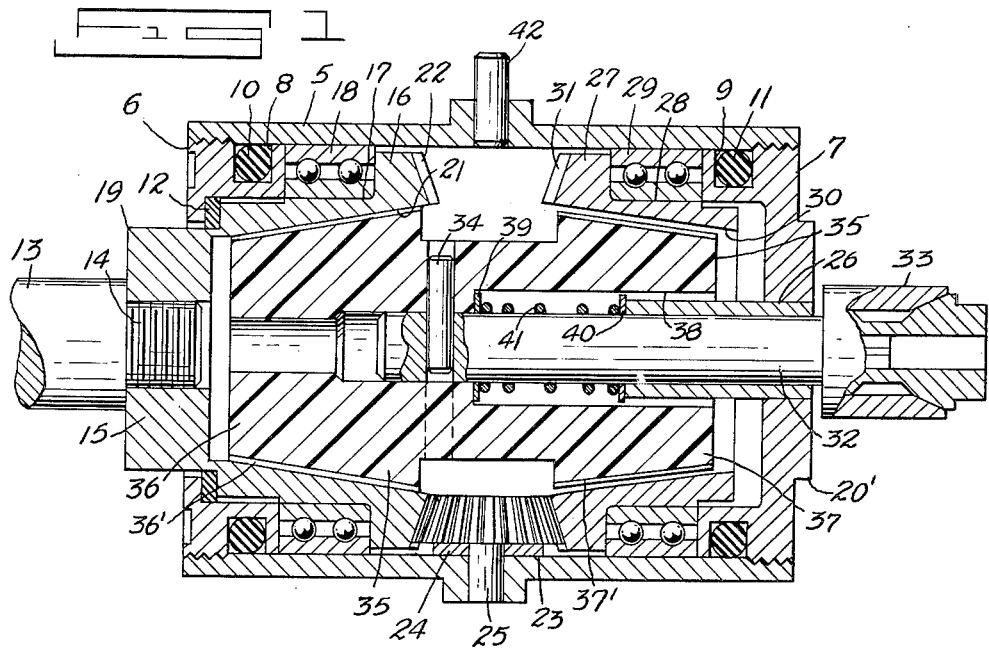
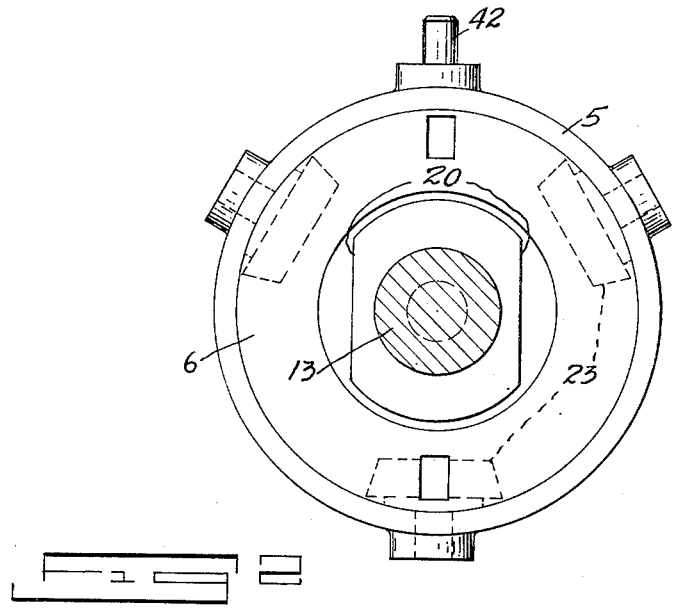
INVENTOR.
ASHER I. ZAGAR
BY
Howard Thompson
ATTORNEY

3,051,013
FORWARD AND REVERSE FRICTION DRIVE TAPPING ATTACHMENT

Asher I. Zagar, Brooklyn, N.Y., assignor to Ettco Tool & Machine Co., Inc., Brooklyn, N.Y., a corporation of New York
Filed Aug. 22, 1958, Ser. No. 756,668
1 Claim. (Cl. 74—379)

This invention relates to tapping attachments employing an economical structural assemblage in which is incorporated means for providing free rotation of the forward and reverse drive clutch elements in the casing of the attachment. Further, the invention deals with devices of this class wherein means is provided for effecting seals at end portions of the casing of the device.

Still more particularly, the invention deals with an attachment wherein a one-piece plastic forward and reverse drive clutch element is employed.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a longitudinal sectional view through an attachment made according to my invention, with parts of the construction shown in elevation; and FIG. 2 is an end view of the left-hand end of the attachment, as shown in FIG. 1, diagrammatically illustrating positioning of the three idler pinions employed.

This invention deals with tapping attachments of the type and kind disclosed in application Serial No. 738,497, filed May 28, 1958, and issued in Patent Number 2,959,974, dated November 15, 1960 of which the present attachment constitutes an improvement.

In FIG. 1 of the drawing, I have shown at 5 an elongated casing, generally tubular in form, and the ends of the one diameter bore of the tube are tapped for support of end plates or nuts 6 and 7. Each of the nuts has 8 and 9, in the grooves of which are arranged O-sealing inwardly extending circumferentially grooved positions rings, as indicated at 10 and 11, to effect a seal of the casing, facilitating operation of the parts in the presence of a lubricant. It will further be apparent that plate 6 is also grooved to support a further packing ring as at 12.

At 13 is diagrammatically illustrated the end portion of a driving spindle of a drill press or the like, having a reduced threaded portion 14 for attachment of the forward drive member 15 of the attachment.

The member 15 has a body portion 16, fitting freely within the casing 5. The periphery of the body portion 16 is reduced, as seen at 17, to fit freely within the part 8 of 6 and to form a support for a self-aligning ball-bearing 18, which is fitted snugly in the bore of the casing 5.

The member 15 has a reduced outward extension 19 threaded to receiver 14. The sides of this extension are flattened, as seen at 20 in FIG. 2 of the drawing, to facilitate attachment and detachment of the plate 6. At this time, it is pointed out that the plate 7 has a similar flattened side extension 20′ to accomplish the same result.

The member 15 has a conical bore 21 forming the clutch surface of this member, and the inner surface of the body 16 is fashioned to form the beveled gear, as indicated at 22, adapted to engage a plurality of idler beveled pinions 23, one of which is shown in elevation in FIG. 1 of the drawing, and the spacing of these pinions is indicated in dotted lines in FIG. 2 of the drawing.

The pinions 23 are preferably formed of nylon, as are also spacer rings 24, one of which is shown in section in FIG. 1 of the drawing. Stub shafts or pins 25 for support of the idlers preferably have a drive fit in the casing 5.

The plate 7 includes an inwardly projecting bearing sleeve portion 26.

At 27 is shown the reverse drive member of the attachment which is recessed, as seen at 28, to form a support for a self-aligning ball-bearing 29 having a snug mounting in the casing 5, the member 27 being freely mounted therein.

At 30 is shown the conical clutch bore of the member 27 generally similar to the bore 21. The inner surface of the member 27 has a beveled gear 31, similar to the gear 22, which meshes with the idler pinions 23.

Mounted in the bearing 26 is a tool driving spindle 32, supporting, on its protruding or free end, a suitable tap collet, as diagrammatically seen at 33. The collet is used for coupling a tap with the end of the spindle 32, as will be apparent.

Pinned to the inner end of the spindle 32, as seen at 34, is a one-piece forward and reverse drive clutch element 35, preferably formed of a plastic material such as nylon. The element 35 has a forward drive conical end 36 and a reverse drive conical end 37, peripheral surfaces of the conical ends having circumferentially spaced longitudinal extending grooves as at 36′ and 37′. The pin 34 is mounted in an aperture in the reduced central portion of the element 35.

It will appear that the element 36, at the conical end portion 37, has a large diameter bore 38, freely receiving the bearing 26. At the base of this bore is positioned a washer 39, a similar washer 40 being arranged at the inner end of the bearing 26.

Mounted on the spindle 32, between the washers, is a spring 41 which normally urges the forward drive of the clutch 37 into engagement with the conical bore 21 and the member 15. This particular position is maintained while a tap is advanced into the work. However, in the reverse operation or withdrawal of the tap from the work, the spindle 32 is drawn outwardly, disengaging 36 with 15 and bringing 37 into engagement with the bore 30 of the reverse drive clutch 27.

Fixed to the casing 5, intermediate 2 of the pinions 23, is a protruding pin 42, constituting a stop pin or rod which engages a suitable stop, not shown, for preventing rotation of the casing 5, as with other devices of this type and kind.

With the present construction, it will appear that the clutch members 15 and 27 have a free and self-aligned rotatable mounting in the casing 5, thereby providing a free operation of the attachment in both the forward and reverse drives thereof.

Having fully described my invention, what I claim as new and desire to secure by Letters Patent is:

A tapping attachment comprising a tubular casing having a one diameter bore, a forward drive member rotatable in and protruding from one end of the casing, means for attachment of a drive spindle with said member, a reverse drive member rotatably mounted entirely within the other end portion of the casing, both members having, on adjacent surfaces, conical bores, the bore of the first member extending the major portion of the length thereof, the bore of the second member extending the full length thereof, terminal ends of said adjacent surfaces having bevelled gears meshing with a plurality of bevelled idler pinions mounted on and spaced circumferentially in said casing, a one-piece plastic clutch element arranged within the casing and the conical bores of both of said members, said element having conical ends arranged and maintained within and operatively engaging the conical bores of said members in the forward and reverse drives of the attachment, the ends of the bore of the casing being threaded, end plates in threaded engagement with said threaded ends to form closures for the ends of the casing, said end plates within the casing having annular grooves in the periphery thereof, O-sealing rings arranged in the grooves of said plates and seating in the bore of said casing, both members being spaced from the bore of the casing and said end plates for free rotation therein, one end plate having a bearing sleeve extending into the casing and said element, tensional means arranged entirely within said element and operatively engaging said bearing sleeve and said element in normally supporting one conical end of said element in operative engagement with the forward drive member, said element including a shaft portion supported in said bearing sleeve, anti-friction bearings arranged between said members and the casing for free rotation of both of the members in said casing, and said anti-friction bearings being of the self-alining type.

References Cited in the file of this patent

UNITED STATES PATENTS

| | | |
|---|---|---|
| 1,475,982 | Buhr | Dec. 4, 1923 |
| 1,988,967 | Emrick | Jan. 22, 1935 |
| 2,511,495 | Crot | June 13, 1950 |
| 2,756,854 | Brenholts | July 31, 1956 |
| 2,778,238 | Emrick | Jan. 22, 1957 |
| 2,804,779 | Bergstedt | Sept. 3, 1957 |
| 2,857,030 | Samo | Oct. 21, 1958 |
| 2,959,974 | Emrick | Nov. 15, 1960 |

FOREIGN PATENTS

| | | |
|---|---|---|
| 619,531 | France | Jan. 4, 1927 |
| 453,345 | Canada | Dec. 14, 1948 |